United States Patent
Chowdhuri et al.

(10) Patent No.: US 6,674,443 B1
(45) Date of Patent: Jan. 6, 2004

(54) MEMORY SYSTEM FOR ACCELERATING GRAPHICS OPERATIONS WITHIN AN ELECTRONIC DEVICE

(75) Inventors: Bhaskar Chowdhuri, San Jose, CA (US); Kanwal Preet Singh Banga, San Jose, CA (US); Frank Palazzolo, Jr., San Jose, CA (US); Ugo Zampieri, Pregnin (FR)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/476,486

(22) Filed: Dec. 30, 1999

(51) Int. Cl.[7] .................................................. G09G 5/36
(52) U.S. Cl. ..................... 345/557; 345/543; 345/531; 711/129
(58) Field of Search ................................. 345/531, 532, 345/543, 544, 552, 557, 501, 582; 711/118, 129

(56) References Cited

U.S. PATENT DOCUMENTS

| | | | |
|---|---|---|---|
| 4,546,451 A | 10/1985 | Bruce | 364/900 |
| 5,131,080 A | 7/1992 | Fredrickson et al. | 395/164 |
| 5,559,952 A * | 9/1996 | Fujimoto | 345/531 |
| 5,815,168 A | 9/1998 | May | 345/516 |
| 5,828,382 A * | 10/1998 | Wilde | 345/552 |
| 5,844,576 A * | 12/1998 | Wilde et al. | 345/552 |
| 5,903,170 A | 5/1999 | Kulkarni et al. | 326/134 |
| 6,002,410 A * | 12/1999 | Battle | 345/552 |
| 6,002,412 A * | 12/1999 | Schinnerer | 345/532 |
| 6,144,392 A * | 11/2000 | Rogers | 345/552 |
| 6,314,494 B1 * | 11/2001 | Keltcher et al. | 711/119 |

FOREIGN PATENT DOCUMENTS

WO    WO 98/54691    12/1998

* cited by examiner

Primary Examiner—Kee M. Tung
(74) Attorney, Agent, or Firm—Lisa K. Jorgenson; Andre Szuwalski

(57) ABSTRACT

The present invention relates to a system and method for accelerating graphics. The system includes a memory device for accelerating graphics operations within an electronic device. A memory controller is used for controlling pixel data transmitted to and from the memory device. A cache memory is electrically coupled to the memory and is dynamically configurable to a selected usable size to exchange an amount of pixel data having the selected usable size with the memory controller. The memory device may be an SDRAM. The cache memory may also comprise a plurality of usable memory areas or tiles.

29 Claims, 9 Drawing Sheets

No anti-aliasing

| Tile Mechanism | Total Lines | Total Pixels | Avg. pixels per line | Cache Hit # | Memory clock # | Performance Improvement |
|---|---|---|---|---|---|---|
| No Tiling, Single Tile Cache | 408 | 5683 | 13 | 0 | 85245 | Normal case |
| Fixed Tiling 8x8, Single Tile Cache | 408 | 5683 | 13 | 4694 | 23566 | 72.4% |
| Fixed Tiling 8x8, Double Tile Cache | 408 | 5683 | 13 | 4720 | 23164 | 72.8% |
| Dynamic Tiling, Single tile cache | 408 | 5683 | 13 | 4735 | 22961 | 73.1% |
| Dynamic Tiling, Double tile cache | 408 | 5683 | 13 | 4761 | 22560 | 73.5% |

FIG. 9

Anti-aliasing with no destination read

| Tile Mechanism | Total Lines | Total Pixels | Avg. pixels per line | Cache Hit # | Memory clock # | Performance Improvement |
|---|---|---|---|---|---|---|
| No Tiling, Single Tile Cache | 408 | 17041 | 41 | 0 | 255615 | Normal case |
| Fixed Tiling 8x8, Single Tile Cache | 408 | 17041 | 41 | 13617 | 74309 | 70.9% |
| Fixed Tiling 8x8, Double Tile Cache | 408 | 17041 | 41 | 15851 | 41108 | 83.9% |
| Dynamic Tiling, Single tile cache | 408 | 17041 | 41 | 13021 | 83286 | 67.4% |
| Dynamic Tiling, Double tile cache | 408 | 17041 | 41 | 15881 | 40668 | 84.1% |

FIG. 10

Anti-aliasing with destination read

| Tile Mechanism | Total Lines | Total Pixels | Avg. pixels per line | Cache Hit # | Memory clock # | Performance Improvement |
|---|---|---|---|---|---|---|
| No Tiling, Single Tile Cache | 408 | 34082 | 83 | 0 | 511230 | Normal case |
| Fixed Tiling 8x8, Single Tile Cache | 408 | 34082 | 83 | 30658 | 196523 | 61.6% |
| Fixed Tiling 8x8, Double Tile Cache | 408 | 34082 | 83 | 32892 | 94101 | 81.6% |
| Dynamic Tiling, Single tile cache | 408 | 34082 | 83 | 30062 | 224028 | 56.2% |
| Dynamic Tiling, Double tile cache | 408 | 34082 | 83 | 32922 | 92756 | 81.9% |

*FIG. 11*

MEMORY SYSTEM FOR ACCELERATING GRAPHICS OPERATIONS WITHIN AN ELECTRONIC DEVICE

BACKGROUND OF THE PRESENT INVENTION

1. Field of the Invention

The present invention relates generally to a method and apparatus for enhancing performance of graphics operations. More particularly, the invention relates to two-dimensional graphics operations.

2. Description of the Related Art

For many graphics operations such as line drawing, polygon rendering, etc., one of the main bottlenecks for speed performance is the bandwidth of the frame buffer. The bandwidth of the frame buffer is even more critical for system on a chip (SOC) devices that use unified memory architecture (UMA). In UMA systems, the same memory is shared between many agents, such as a central processing unit (CPU), a graphics accelerator, an MPEG decoder, and a CRT controller. Because there are several agents sharing the same memory, a large access latency for the memory is created. The typical access latency for the memory is fifteen clock cycles or more.

Memory systems implemented with synchronous dynamic random access memory (SDRAM) have advantage that if an agent requests a large chunk of sequential pixel data, then the first pixel data latency may be the same as normal DRAM memory, but subsequent pixel data can be transferred every clock cycle (provided the pixel data is located in the same page of memory). Unfortunately, graphics accelerators cannot use this feature directly for most drawing operations, including line drawing where the access of pixel data is not very sequential.

FIG. 1 shows a conventional UMA System 100 where an SDRAM controller 110 is electrically coupled between an SDRAM memory 120A and several agents, such as a CPU 130, an MPEG decoder 140, a graphics engine 150, and a CRT controller 160. A frame buffer 125 comprises the combination of the SDRAM controller 110 and part of the SDRAM memory 120A. As suggested by the UMA system 100, each agent operating in a graphics system communicates to the SDRAM 120A via the SDRAM controller 110. Because each agent communicates directly to the SDRAM controller 110, each agent must operate with a memory configuration as defined by the frame buffer 125, whether or not each agent is optimized for the memory configuration within the frame buffer 125.

It should be understood that the frame buffer 125 is a memory for storing pixel data for a visual display. To manipulate an image on the visual display, pixel data may be written to the frame buffer 125 by, for instance, the CPU 130, and read by the CRT controller 160 to display the pixel data on the visual display. For instance, to make the visual display completely white, each memory element within the frame buffer 125 may be written pixel data corresponding to the color white. Also, if graphical elements, such as a triangle or rectangle, is to be drawn, the graphics engine 150 may write pixel data to the frame buffer 125 to create or manipulate different graphical elements.

Most operations in windows type programs are rectangles. Because rectangles are highly sequential elements (e.g., pixels 10, 11, . . . , 20) for each scan line, standard scan line configured memories are suitable for standard windows operations. However, in systems that utilize non-horizontal or non-vertical lines, such as computer aided design (CAD) systems and map display systems, access to pixel data is not sequential in the frame buffer 125, thereby causing a problem or degrading system performance.

The system performance issues are related to the frame buffer 125 generally being implemented using SDRAM memory. SDRAM memory typically has a certain latency or access time to access a first memory location (e.g., pixel 10), but not much time to access the next memory location (e.g., pixel 11). While this is adequate for forming straight lines (i.e., horizontal or vertical), non-straight lines (i.e., non-horizontal or non-vertical) are much slower to create or manipulate due to the memory configuration within the frame buffer 125 being arranged in a scan line format.

FIG. 2 represents a memory organization for an SDRAM 120B having a scan line configuration for the pixel data displayed on a visual display, as is conventionally known in the art. For instance, SDRAM 120B represents a visual display having a 768 row by 1024 column pixel image, whereby a first scan line has pixel $P_{1,1}$ 200 in the upper left corner and pixel $P_{1,1024}$ 210 in the upper right corner and a last scan line having pixel $P_{763,1}$ 220 in the lower left corner and pixel $P_{768,1024}$ 230 in the lower right corner. FIG. 2 represents a conventional scan line configured frame buffer 125 that agents, such as the CRT controller 160, are optimized for displaying pixel data from the frame buffer 125 to a visual display. However, the graphics engine 150 performance is significantly reduced (i.e., clock cycles increased) by the conventional scan line configuration in the frame buffer 125.

Access patterns of many graphics operations that include line drawing show a high degree of two-dimensional locality of reference. One approach to improve memory bandwidth for such access patterns has been to use a tiled memory configuration within the frame buffer 125. In this tiled memory configuration, pixel data in the frame buffer 125 is stored in a tiled configuration rather than the conventional configuration (i.e., sequentially one scan line after another (assuming one tile of pixels fits into one DRAM page)). Because of the two-dimensional locality of reference, chances of consecutive accesses falling inside a single tile is very high. As long as the access from the graphics operation falls within a single tile, there will be no page miss for the tiled memory configuration within the frame buffer 125 memory, compared with the conventional scan line or non-tiled memory configuration where a tile is scattered over multiple pages of DRAM.

FIG. 3 represents a frame buffer 120C configured into tiles of fixed size. A first tile T0 300 is indicated to be in the upper left corner and a last tile T383 310 is indicated to be in the lower right corner of the frame buffer 120C. While the frame buffer 125 having fixed tile sizes greatly improves frame buffer access time for graphics operations for the graphics engine 150, fixed tiling the frame buffer 125 is not suitable for UMA systems where a number of other agents expecting the frame buffer 125 to be in the conventional scan line configuration access the frame buffer 125. It is important to understand that performance of certain agents, such as the CRT controller 160, is critical to a real-time system because a user sees visual effects on the visual display if the performance of the CRT controller 160 is degraded. By having the frame buffer 125 configured in a tiled fashion a degradation in the performance of the CRT controller 160 occurs as the CRT controller 160 is optimized for the conventional scan line configuration.

Additionally, there are many existing software products, including many popular video games, which access the frame buffer 125 directly. Since these software programs are not aware of tiled configurations within the frame buffer 125, their access to the frame buffer 125 will not work properly and, consequently, these software programs cannot be run on a system with a tiled frame buffer 125 unless a separate address translator interface is added to translate scan line addresses to tiled addresses. Tiling the frame buffer 125 also has additional overhead for the CPU 130 because of the need to convert many of the windows pixel data structures, such as BitMap images, into a tiled format so that the BitMaps images can be used for graphics operations with the frame buffer 125 having a tiled configuration.

SUMMARY OF THE INVENTION

The present invention relates to a system and method for accelerating graphics operations. The system includes a memory device for accelerating graphics operations within an electronic device. A memory controller is used for controlling pixel data transmitted to and from the memory device. A cache memory is electrically coupled to the memory controller and is dynamically configurable to a selected usable size to exchange an amount of pixel data having the selected usable size with the memory controller. The memory device is preferably an SDRAM. A graphics engine is electrically coupled to the cache memory, which stores pixel data, generally forming a two-dimensional image in a tiled configuration. The cache memory may also comprise a plurality of usable memory areas or tiles.

The present invention also includes a method for accelerating graphics operations within an electronic device. The method includes receiving a request for accessing data relating to a pixel. A determination is made as to which pseudo tile the pixel is located. The pseudo tile is selectively retrieved from a memory device and stored in a cache memory in a tile configuraiton. The requested pixel data is provided from the cache memory, which contains at least one tile.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 9 is a table showing performance of the present invention compared to traditional frame buffer tiling techniques using no anti-aliasing;

FIG. 10 is a table showing performance of the present invention compared to traditional frame buffer tiling techniques using anti-aliasing with no destination read; and FIG. 11 is a table showing performance of the present invention compared to traditional frame buffered tiling techniques using anti-aliasing with destination read.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Reference is now again made to FIG. 1. Unified memory architecture systems operating in electronic devices, such as computers and display devices, including map display systems for vehicles, have many agents, such as a CPU 130, an MPEG decoder 140, a graphics engine 150, and a CRT controller 160, accessing a single frame buffer 125. While several of these agents are not affected or even optimized by the frame buffer 125 being configured in scan lines representing pixels on a visual display (i.e., 768×1024), graphics operations have poor performance. The graphics operations having poor performance is due to the high degree of spacial locality (e.g., two dimensional spacial locality) and sequentiality of graphics operations, which is not present in a memory configuration having a scan line format. By providing a tile cache memory interfaced between the frame buffer and the graphics engine, the graphics engine performance is greatly enhanced as the tile cache memory contains spacial locality of pixels for the graphics engine 150 to operate. Simply speaking, the tile configuration of the tile cache memory improves performance of the graphics engine.

Figure 1:
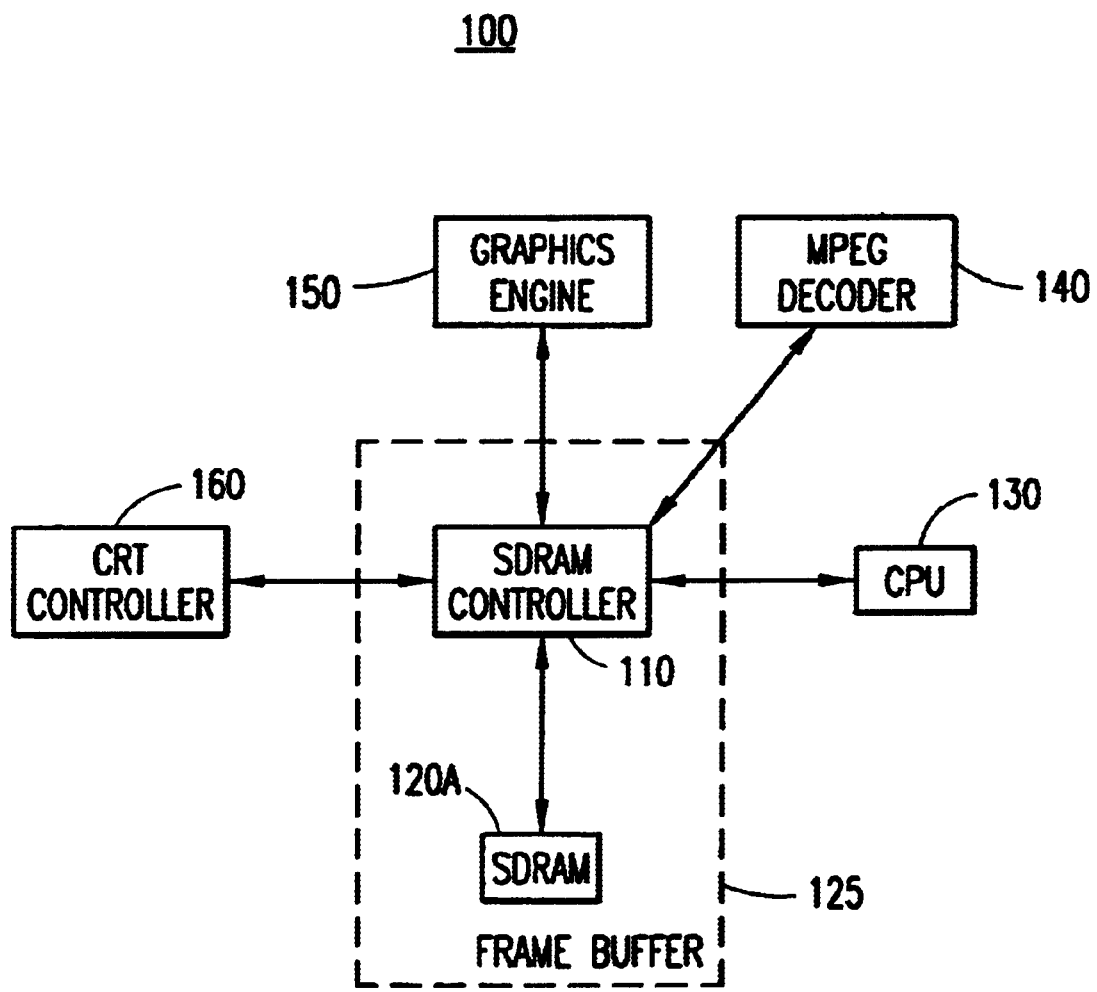
FIG. 1, previously described, is a block diagram of a conventional unified memory architecture for handling graphics operations.
Figure 2:
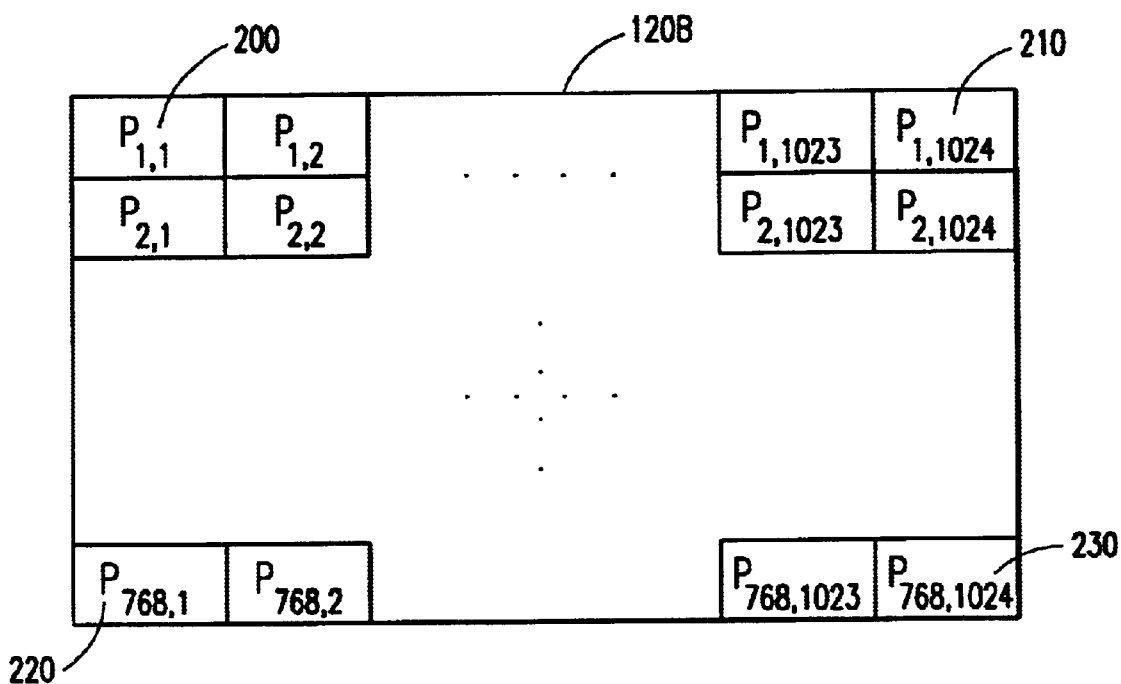
FIG. 2, previously described, is a memory representation in a conventional scan line configuration of a visual display with pixels.
Figure 3:
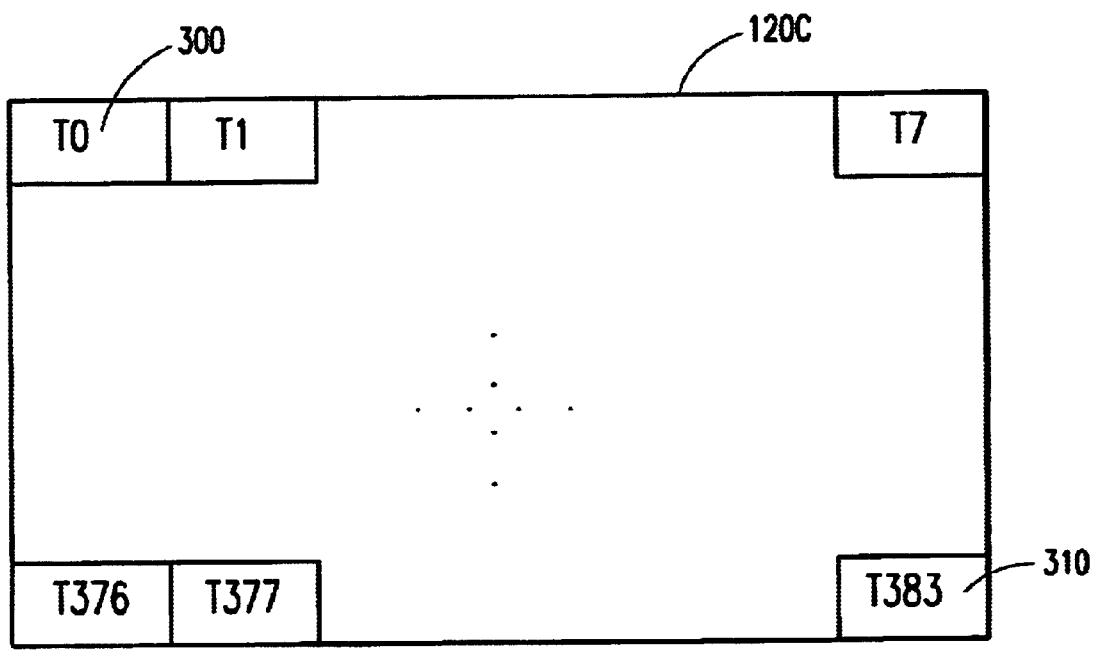
FIG. 3, previously described, is a memory representation in a conventional tiled configuration of a visual display with pixels.
Figure 4:
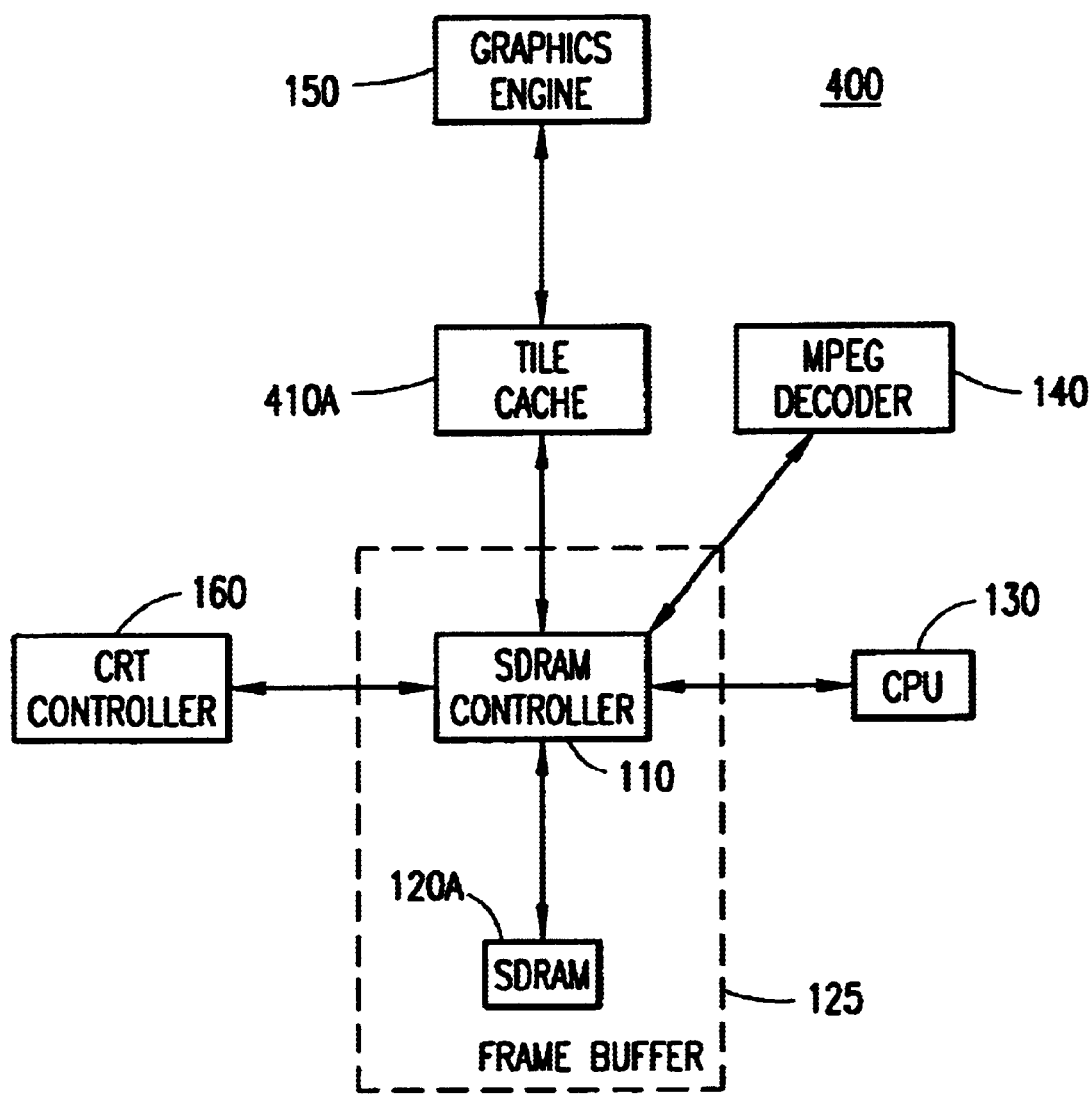
FIG. 4 is a block diagram according to the present invention of a unified memory architecture for handling graphics operations with a tile cache memory electrically coupled between a graphics engine and a memory device.

FIG. 4 represents a UMA system 400 according to the present invention. All of the components 110–160 from FIG. 1 are present in the UMA system 400 with the addition of a tile cache 410A. The tile cache 410A electrically couples the graphics engine 150 to the frame buffer 125. The graphics engine 150 is preferably a two-dimensional (2D) graphics engine, but may be any hardware or software that accesses pixel data within the tile cache 410A so as to alter the pixel data. The tile cache 410A, which is mostly hardware, comprises static random access memory (SRAM). While the present invention preferably utilizes SDRAM in the frame buffer 125, other types of memory may also be used in the frame buffer 125, including graphics DRAM (GDRAM), double data rate SDRAM (DDR-SDRAM), and virtual channel DRAM (VC-DRAM).

By incorporating the tile cache 410A between the frame buffer 125 and the graphics engine 150, from the graphics engine 150 point of view, the frame buffer 125 appears to be configured into tiles (i.e., pseudo tiles) representing a number of rectangular regions forming the visual display (i.e., screen). Pseudo tiling provides an impression to the graphics engine that the frame buffer is configured into a tile format, while, in reality, the cache memory, which is seen by the graphics engine, is configured into the tile format and the frame buffer is in scan line format. It should be understood that the term "pseudo tile" is used when referring to the configuration of the pixel data stored in the frame buffer and the term "tile" is used when referring to the configuration of the pixel data stored in the cache memory.

The tile cache 410A uses a small (e.g., 1K byte) SRAM that is marked empty after a reset. When the graphics engine 150 requests pixel data with a given coordinate (e.g., X,Y), the graphics engine first calculates which pseudo tile the coordinates are associated. As previously stated, pseudo tiling makes the frame buffer 125 appear to be in a tile configuration to the graphics engine 150, but otherwise the frame buffer 125 appears and operates in the conventional scan line configuration with respect to the other components of the UMA system 400. A tile, according to the present invention, is a configuration within the tile cache 410A representative of a certain locality of elements, such as pixels of close proximity on a visual display.

Figure 5:
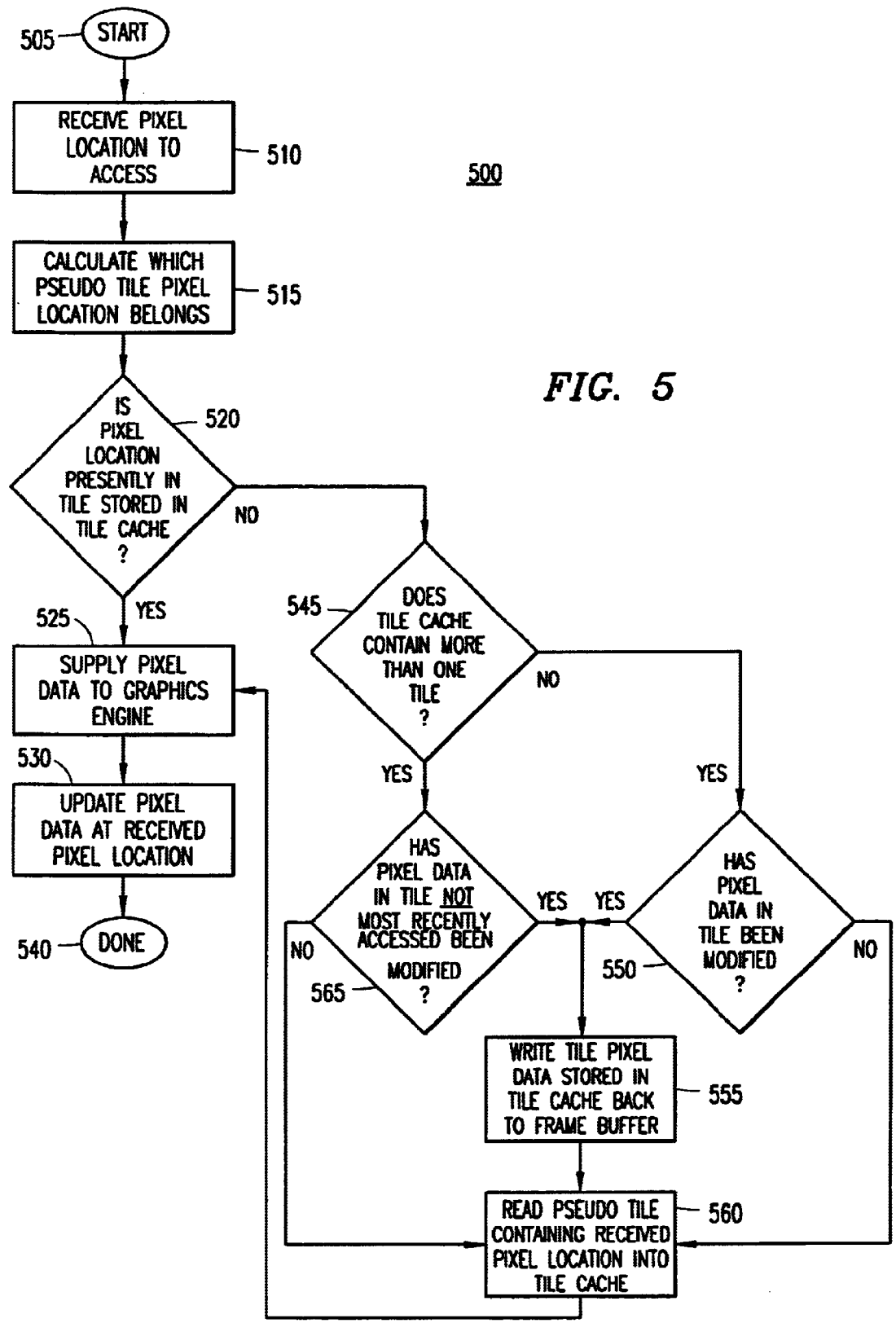
FIG. 5 is a representative flow diagram of a method for accessing a pixel datum within the tile cache memory according to the present invention.

FIG. 5 is a representative flow diagram 500 of a method for accessing pixel data within the tile cache 410A. The method starts at step 505 and at step 510, a pixel location to access is received. At step 515, a calculation is made to determine which pseudo tile in the frame buffer 125 the pixel location belongs.

At step 520, a determination is made to determine whether the pixel location is presently contained in the tile, if any, currently stored in the tile cache 410A. If the pixel location is presently located in the tile stored in the tile cache, then the pixel data is supplied to the graphics engine at step 525 from that tile without having to access the frame buffer 125. At step 520, the pixel data at the requested pixel location is updated. The method is then completed at step 540.

If the pixel location is not presently in the pseudo tile stored in the tile cache 410A, then the method, at step 545, determines whether the tile cache 410A contains more than one tile. Details of the tile cache 410A containing more than one tile is described hereinafter with regard to FIG. 8. If the tile cache does not contain more than one tile, then, at step 550, it is determined whether the pixel data in the tile stored in the tile cache 410A has been modified. If the pixel data in the tile has been modified, then at step 555, the pixel data in the tile stored in the tile cache 410A is written back to the frame buffer 120A. At step 560, a pseudo tile from the frame buffer 125 containing the received pixel location is read into the tile cache 410A. The pixel data is then supplied to the graphics engine 150 at step 525 and the pixel data at the received pixel location is updated at step 530. The procedure is then completed at step 540. If the pixel data in the tile within the tile cache 410A has not been modified, the procedure skips step 555 and a new pseudo tile from the frame buffer 125 containing the requested pixel location is read into the tile cache 410A, thereby overwriting the previous tile stored in the tile cache 410A.

If it is determined at step 545 that the tile cache contains more than one tile, it is determined whether the pixel data in the tile stored in the tile cache 410A not most recently accessed has been modified. If the pixel data in the tile not most recently accessed has been modified, then at step 555, the pixel data in the tile not most recently accessed is written back to the frame buffer 125 from the tile cache 410A. At step 560, a pseudo tile from the frame buffer 125 containing the requested pixel location is read into the tile cache 410A in the location of the tile that was written back to the frame buffer 125 was located. Otherwise, if the pixel data in the pseudo tile not most recently accessed has not been modified, the procedure skips step 555 and a pseudo tile from the frame buffer 125 containing the requested pixel location is read into the tile cache 410A where the pseudo tile not most recently accessed resides. The pixel data is supplied to the graphics engine at step 525 and the pixel data is updated at the requested pixel location at step 530. At step 540, the procedure is completed.

It should be understood that the purpose for retrieving a pseudo tile worth of pixel data and placing it into the tile cache 410A is to increase locality of associated pixels. By increasing the locality of associated pixels, access times for the graphics engine 150 are reduced because there is a greater chance of accessing neighboring pixels from the previous pixel being accessed. In other words, there is a greater chance of accessing a neighboring pixel to the previous pixel so that the minimum fifteen clock cycle access time is reduced to a single clock access time for each neighboring pixels. To fill the tile cache 410A, whenever there is an access to a particular pixel not presently stored in the tile cache 410A, the tile cache 410A reads data surrounding that particular pixel (i.e., a pseudo tile). It should be understood that the other system components are not affected by the addition of the tile cache 410A as they can still access the frame buffer 125 in standard data format (i.e., scan line format), meaning the other system components are not negatively affected as in the case of tiling the frame buffer itself.

One can analogize the purpose for reading pixel data in surrounding locations to the accessed pixel by considering a volume set of books stored in a library. If someone were to request Volume V of the volume set of books, a librarian would be prudent to retrieve, in addition to Volume V, Volumes IV and VI as the likelihood of either Volumes IV or VI being next requested is greater than a volume farther away from Volume V, such as Volume XVII. So, if the graphics engine 150 requests a particular pixel, a determination is made as to which pseudo tile the particular pixel belongs and the entire pseudo tile is read from the frame buffer 125 into the tile cache 410A. The pseudo tile configuration is dynamically programmable (i.e., the height and width of the pseudo tile is received by the tile cache 410A and in that height-by-width amount of pixel data is read into the tile cache).

Depending on the SDRAM 120A configuration, each page of SDRAM contains between 2K to 8K bytes of data. The pages are then distributed over two or four banks of memory (again, depending on the SDRAM 120A configurations). SDRAM 120A is selected such that at least one scan line fits into one page of SDRAM.

As a row of the tile in the tile cache 410A is filled, there is no page miss as the scan line to which the row of pixel data belongs because the pixel data is stored in a single page. When the next row of tile is filled, there is a possibility of a page miss. While accessing the pixel data for the current row, it may be calculated if the next row is going to fall in the same page of the SDRAM 120A. If the next row falls in the same page, then the next row may be accessed without any clock penalty. However, if the next row falls in a separate page, then special action needs to be taken as discussed hereinbelow. Note that irrespective of the number of memory banks in the SDRAM bank 120A (i.e., 2 or 4), if there is a page miss for the next row of the tile, then the next row must be falling in a different memory bank than the current row.

For SDRAM memory, there is a well known technique for hiding page misses if a missed page falls in a different memory bank than the one from where the current pixel data is being supplied. The technique involves overlapping the current pixel data transfer phase with the next page row address selection. This technique is called "seamless read with bank interleaving". In fact, there is almost no penalty if the seamless read with bank interleaving technique is utilized for transferring data from the frame buffer 125 to the tile cache 410A.

Seamless read with bank interleaving allows a memory bank to be deactivated before the last data has been output by the SDRAM 120A, which is not the case with write operations. Therefore, write operations are not as effective as read operations in hiding the latency associated with row deactivation operations. This write operation issue does not affect the tile cache 410A operations as the SDRAM controller 110 normally uses a buffer to collect the write data before it writes the pixel data to the SDRAM 120A. So, the tile cache 410A is not held up until the write operation actually finishes on the SDRAM 120A. In other words, using the tile cache 410A, pixel data is accessed from the frame buffer 125 at the same rate as in the case of the frame buffer 125 having fixed tile size.

One question may come to mind, why use tile cache at all? The answer is that in order to use the seamless read with bank interleaving process, the access pattern must be known. However, by definition, it is not possible to know the access pattern due to the nature of random accesses for graphics operations. Advantageously, when performing a tile cache fill, the system accesses a pattern already known.

It should be understood that the frame buffer 125 stays in normal scan line order, but the tile cache 410A is in a tiled configuration. And, since the tile cache 410A is SRAM, no penalty for access is incurred, meaning that the graphics engine 150 can access any pixel datum within the tile cache 410A in any order without receiving a penalty in cycle time.

Figure 6:
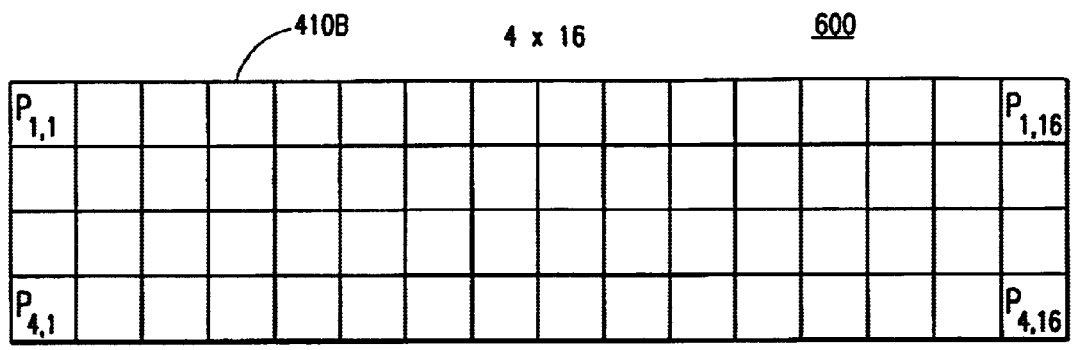
FIG. 6 is a representation of the tile cache memory having a 4×16 pixel matrix tile.
Figure 7:
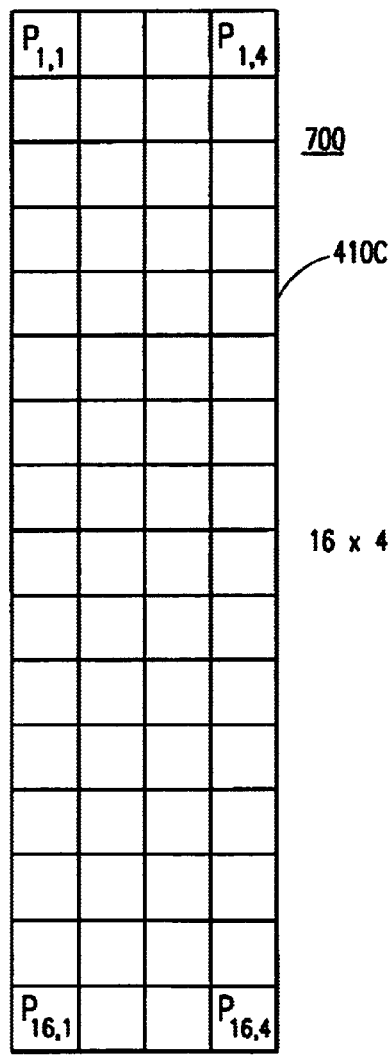
FIG. 7 is a representation of the tile cache memory having a 16×4 pixel memory tile.

An additional benefit of utilizing a pseudo tile cache technique with the tile cache 410A over a fixed tile technique with the frame buffer 125 is that the tile configuration or dimensions can change dynamically depending upon the characteristic of the current graphics operation. As shown in FIG. 6, the pseudo tile 600 is configured as a 4×16 pseudo tile size which lends itself well to horizontal or near horizontal line drawing. FIG. 7, conversely, is configured to have a 16×4 pseudo tile size, which lends itself well to vertical or near vertical line drawing. Allowing dynamic change (i.e. aperiodic size changing) of tile dimensioning results in maximum tile hits (i.e., accessing pixel data within the present tile cache). Such dynamic tiling is possible because the pseudo tiling does not involve changing the frame buffer 125 contents. Tile dimensions are dynamically changeable at discrete instances while reading or writing pixel data into the tile cache 410A.

Figure 8:
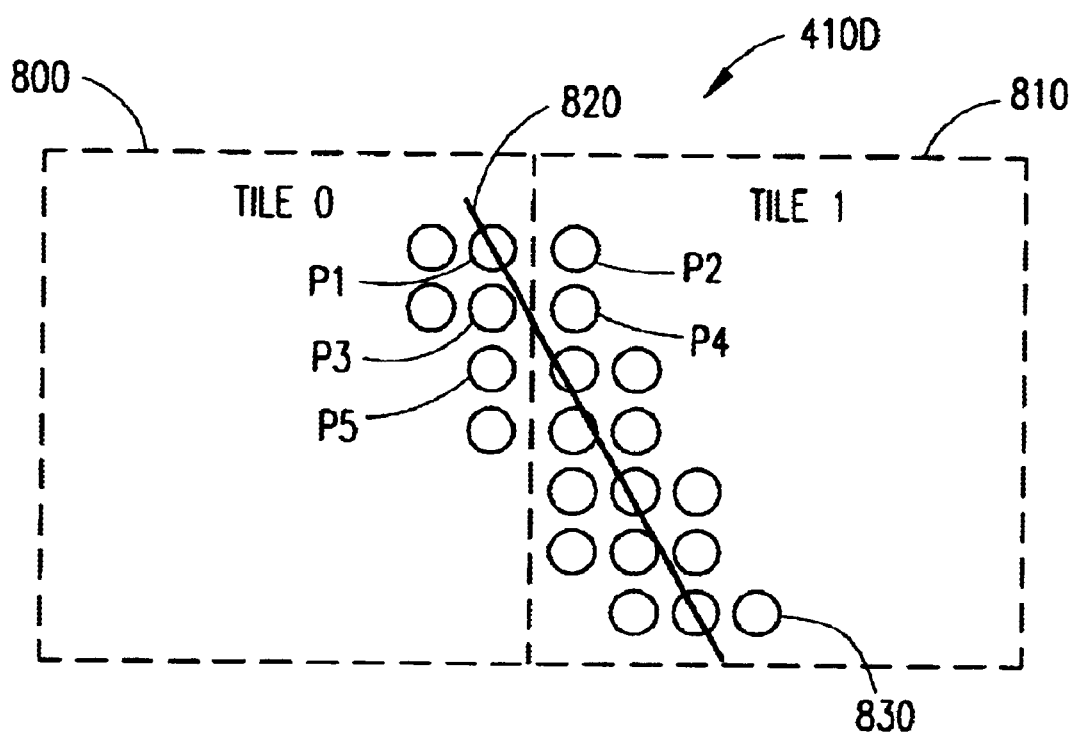
FIG. 8 is a representation of a tile cache memory containing two tiles where a graphical line spans across pixels contained within the two tiles.

FIG. 8 shows a tile cache 410D having two tiles 800 and 810, each having a selected usable size. It should be understood that each tile 800 and 810 may be a tile having a different shape depending upon the graphics operation desired by the graphics engine 150.

A line 820 is shown crossing between tile 800 and tile 810. Many graphics operations have access patterns that result in tile thrashing. Tile thrashing is a phenomenon that occurs when a pixel is accessed in a first tile and then a next pixel is located in a second tile. This causes, in the case of having only a single tile cache, the tile cache 410A to exchange, or read and write, its data content with the frame buffer 125 so that the tile cache 400 can have access to the pixels located in the first tile and the second tile, alternately.

However, by using a two-tile cache, as shown in FIG. 8, the graphics engine 150 can access both data in the first tile 800 and the second tile 810 so that tile thrashing does not occur.

A typical scenario for tile thrashing to occur is when performing a graphics operation using anti-aliasing, which is a technique for smoothing a non-horizontal or non-vertical line on a visual display by filling in "steps" on the line with additional pixels being turned on, at least partially, to make the line appear smoother. In the case of drawing line 820, pixels P1–P5, etc., are accessed. However, pixels P1, P3, and P5 are located in tiles 800 and pixels P2 and P4 are located in tile 810 so that if the tile cache 410A is a single tile cache, tile thrashing occurs and there is a reduction bandwidth.

It should be noted that if there is a tile access miss (i.e., a pixel that does not currently reside within tile 800 or tile 810), then the tile that has not been most recently used is replaced with a new pseudo tile from the frame buffer 125. This technique of using two tiles within the tile cache 410A results in a 60% to 70% improvement in the memory bandwidth compared to the tile cache 410A only having a single tile.

FIGS. 9–11 show results in tables produced by a simulation to show statistics of using various configurations of tiling, including no tiling, fixed tiling, and dynamic tiling, including single and double tile cache. FIG. 9 shows results of a simulation using no anti-aliasing for line drawing. FIG. 10 shows results of a simulation using anti-aliasing for line drawing with no destination read. And, FIG. 11 shows results of a simulation using anti-aliasing with destination read. As seen by the results obtained through use of the simulation, pseudo tiling of the frame buffer 125 significantly boosts the memory bandwidth by reducing the number of memory cycles utilized to complete the graphics operations. Maintaining a dual tile cache further enhances (almost doubles), the performance of the memory by eliminating tile thrashing. Moreover, other agents interfacing with the frame buffer 125 are not affected since no special data rearrangement is done in the frame buffer 125.

The previous description is of a preferred embodiment for implementing the invention, and the scope of the invention should not necessarily be limited by this description. The scope of the present invention is instead defined by the following claims.

What is claimed is:

1. A system including a memory device for accelerating line drawing graphics operations within an electronic device, the system comprising:
   a memory controller for controlling pixel data transmitted to and from the memory device; and
   a cache memory electrically coupled to the memory controller, the cache memory being dynamically, two-dimensionally configurable to a selected usable size to exchange an amount of data associated with line drawing having the selected usable size with the memory controller, said memory controller operable to change the usable size of the cache memory during graphics operations in response to receiving independent parameters received by the cache memory defining a height and width to form a tile of the selected usable size.

2. The system according to claim 1, further comprising a graphics engine electrically coupled to the cache memory, wherein the graphics engine accesses data stored in the memory device.

3. The system according to claim 2, wherein the selected size is determined by the graphics engine.

4. The system according to claim 2, wherein the graphics engine is a two-dimensional graphics engine.

5. The system according to claim 1, wherein the data in the cache memory corresponds to a two-dimensional image.

6. The system according to claim 1, wherein the height is between four and eight pixels.

7. The system according to claim 1, wherein the cache memory comprises static random access memory (SRAM).

8. The system according to claim 1, wherein the cache memory is dynamically configured at a plurality of discrete instances.

9. The system according to claim 1, wherein data stored in rows and columns of the cache memory are stored in the same relative positions of the data stored in rows and columns in the memory device.

10. The system according to claim 1, wherein the electronic device is at least one of the following:
   a computing device; and
   a display device.

11. The system according to claim 1, wherein the cache memory comprises at least one selected usable size of memory, whereby each of said at least one selected usable size of memory is individually selected.

12. The system according to claim 1, wherein the memory device is configured in a scan line format and the cache memory is configured in a tile format.

13. The system according to claim 1, wherein said memory controller is further operable to utilize seamless read with bank interleaving in communicating the data associated with the line drawing between the memory controller and cache memory.

14. A method for accelerating line drawing graphics operations within an electronic device, the method comprising the steps of:
   configuring a two-dimensional cache memory to a first selected size usable for graphics operations;
   receiving independent parameters defining a height and width;
   changing the first selected size of the two-dimensional cache memory to a second selected size during a graphics operation based on the independent parameters to form a tile of the second selected size; and
   exchanging an amount of data associated with line drawing having the second selected size with a memory device.

15. The method according to claim 14, further comprising the step of receiving independent parameters for the first selected size to configure the cache memory.

16. The method according to claim 14, wherein the data in the cache memory corresponds to a two-dimensional image.

17. The method according to claim 14, wherein the step of dynamically configuring the cache memory is performed at a plurality of discrete instances.

18. The method according to claim 14, wherein data stored in rows and columns of the cache memory are stored in the same relative positions of the data stored in rows and columns in the memory device.

19. The method according to claim 14, further comprising the steps of:
   reading data from the memory device into the cache memory;
   receiving data to electrically alter at least one datum of said data;
   electrically altering said at least one datum in the cache memory; and
   writing the data after the step of electrically altering from the cache memory into the memory device.

20. The method according to claim 14, wherein the step of configuring a cache memory comprises configuring the cache memory in at least one memory area therein.

21. The method according to claim 14, further comprising performing seamless read with bank interleaving in communicating the data associated with the line drawing.

22. A method for accelerating line drawing graphics operations within an electronic device, said method comprising the steps of:
   receiving a request for accessing data relating to a pixel of a line;
   determining a two-dimensional pseudo tile in which the pixel of the line is located;
   selectively retrieving data associated with the line from a memory device corresponding to the pseudo tile;
   based on the data associated with the line, generating independent parameters defining a height and a width for changing a tile configuration within a cache memory;
   storing the data associated with the line from the pseudo tile in the changed tile configuration within the cache memory; and
   providing the requested pixel data from the cache memory in response to the request.

23. The method according to claim 22, further including the step of determining if the data of the tile presently stored in the cache memory contains the pixel.

24. The method according to claim 22, wherein the tile cache contains at least one tile.

25. The method according to claim 24, further comprising the steps of:
   determining if the tile cache contains more than one tile; and
   determining whether the pixel data in the tile not most recently accessed been modified.

26. The method according to claim 22, further comprising performing seamless read with bank interleaving in communicating the data associated with the line drawing.

27. A system for accelerating line drawing graphics operations within an electronic device, the system comprising:
   a cache memory arranged in a tile configuration, said cache memory capable of having data stored in said cache memory being selectively altered, the tile configuration of the cache memory being based on at least two independent parameters being received;
   a memory arranged in a scan line configuration electrically coupled to the cache memory; and
   means for enabling the cache memory to alter at least one datum of the data associated with a line graphic stored in the cache memory during a line drawing graphics operation.

28. The system according to claim 27, wherein the memory comprises at least one of the following:
   a synchronous dynamic random access memory (SDRAM);
   a graphics DRAM;
   a double data rate SDRAM; and
   a virtual channel DRAM.

29. The system according to claim 27, wherein the means for enabling the cache memory to alter the at least one datum is further operable to seamlessly read with bank interleaving in communicating the data associated with the line drawing.

* * * * *

UNITED STATES PATENT AND TRADEMARK OFFICE
CERTIFICATE OF CORRECTION

PATENT NO. : 6,674,443 B1 Page 1 of 1
DATED : January 6, 2004
INVENTOR(S) : Bhaskar Chowdhuri et al.

It is certified that error appears in the above-identified patent and that said Letters Patent is hereby corrected as shown below:

Column 2,
Line 22, replace "pixel $P_{763,1}$" with -- pixel $P_{768,1}$ --

Signed and Sealed this

Eighth Day of June, 2004

JON W. DUDAS
*Acting Director of the United States Patent and Trademark Office*